(12) United States Patent
Stamenkovic

(10) Patent No.: US 7,310,889 B2
(45) Date of Patent: Dec. 25, 2007

(54) METHOD AND DEVICE FOR THE THREE-DIMENSIONAL MEASUREMENT OF OBJECTS

(75) Inventor: Milan Stamenkovic, Stuttgart (DE)

(73) Assignee: Stotz Feinmesstechnik GmbH, Gerlingen (DE)

( * ) Notice: Subject to any disclaimer, the term of this patent is extended or adjusted under 35 U.S.C. 154(b) by 0 days.

(21) Appl. No.: 10/530,637

(22) PCT Filed: Oct. 6, 2003

(86) PCT No.: PCT/EP03/11031

§ 371 (c)(1),
(2), (4) Date: Nov. 1, 2005

(87) PCT Pub. No.: WO2004/033991

PCT Pub. Date: Apr. 22, 2004

(65) Prior Publication Data

US 2006/0162175 A1    Jul. 27, 2006

(30) Foreign Application Priority Data

Oct. 8, 2002 (DE) ................................ 102 46 781

(51) Int. Cl.
G01B 21/04 (2006.01)
(52) U.S. Cl. ....................................................... 33/503
(58) Field of Classification Search .................. 33/503, 33/1 G, 1 K, 1 BB, 1 CC, 549, 551, 553, 33/554, 555
See application file for complete search history.

(56) References Cited

U.S. PATENT DOCUMENTS

| | | | |
|---|---|---|---|
| 4,621,926 A * | 11/1986 | Merry et al. | 356/508 |
| 4,691,446 A | 9/1987 | Pitches et al. | |
| 5,150,529 A * | 9/1992 | Collingwood | 33/503 |
| 5,778,550 A * | 7/1998 | Carli et al. | 33/503 |
| 6,157,368 A | 12/2000 | Fager | |
| 6,437,708 B1 * | 8/2002 | Brouwer | 340/988 |
| 6,839,563 B1 * | 1/2005 | Kirby et al. | 455/500 |
| 7,145,468 B2 * | 12/2006 | Collingwood et al. | 340/680 |
| 2001/0024283 A1 | 9/2001 | Granger | |
| 2002/0029128 A1 | 3/2002 | Jones et al. | |

FOREIGN PATENT DOCUMENTS

| | | |
|---|---|---|
| DE | 4407785 A1 | 9/1995 |
| DE | 4233341 C2 | 3/1997 |
| DE | 10048097 A2 | 4/2002 |
| DE | 10048952 A1 | 4/2002 |
| EP | 0895096 A2 | 2/1999 |
| EP | 1122513 A2 | 8/2001 |
| GB | 2285550 A | 7/1995 |
| WO | WO 93/04381 A | 3/1993 |

* cited by examiner

*Primary Examiner*—Christopher W Fulton
(74) *Attorney, Agent, or Firm*—Townsend and Townsend and Crew LLP

(57) ABSTRACT

Disclosed is a method for three-dimensionally measuring objects, according to which the positions of a measuring element (14) are determined by means of a locating method (e.g. optically, electromagnetically, or acoustically), the positions being relative to a reference system defined by the associated locating system (16), and desired dimensions of the object (24) being calculated from the determined positions of the measuring element. Also disclosed is a corresponding device for three-dimensionally measuring objects. The measuring element can be moved by means of a robot arm (26) or a flying object (e.g. a type of zeppelin).

22 Claims, 2 Drawing Sheets

METHOD AND DEVICE FOR THE THREE-DIMENSIONAL MEASUREMENT OF OBJECTS

BACKGROUND OF THE INVENTION

The invention relates to a method and to an apparatus for the three-dimensional measurement of objects.

In known methods for the three-dimensional measurement of objects such as workpieces, the objects are positioned on a measuring table at which an apparatus with a measuring element is movably arranged for the scanning of the outer contours of the objects, with the location of the measuring element being able to be determined via linear, three-dimensional transducers in the x, y and z directions. As a rule, the measuring table is a ground, solid block of marble which is usually installed in a stationary manner.

The measuring element consists, for example, of a scanning measuring sphere which is mechanically connected to a force sensor to ensure a continuous contact with the object. On scanning, the measuring sphere is moved into contact with the object and along the object. A computer determines the outer dimensions of the three-dimensional object from the movement of the measuring sphere along the object using the linear transducers which have a precisely fixed location to the measuring table. Other apparatuses with pneumatic feelers, which can also be positioned into the openings of the workpiece, are used for the measurement of inner dimensions.

Such apparatuses for the three-dimensional measurement of objects are very rarely used directly in production halls since, for example, water or oil used there, chips which occur, vibrations which arise and electrical problems can result in measuring imprecision. An additional disadvantage is the relatively low measuring speed due to the linear transducers and the large space requirements due to the solid marble measuring tables.

Special measuring apparatuses are therefore often used in industry which are only optimized for one measuring task, for example for a diameter measurement of a piston. In addition to scanning spheres, electro-pneumatic transformers, capacitive sensors and inductive scanners are used as measuring elements. The workpieces are introduced into the measuring apparatus using a handling system which can have a very complex design. A handling system is furthermore again required for the removal of the workpieces from the measuring apparatus, for example for the classification into usable and non-usable workpieces or workpieces which have to be reworked.

Measuring elements for the scanning of the object are provided, for example, on a crane or a stand for large objects to be measured such as car bodies. The crane or the stand and the object to be measured are movable relative to one another in order to scan the object sectionally with the measuring elements arranged on the crane or on the stand. It is disadvantageous in this process that there is a limitation with respect to the size of the measurable object due to the dimensions of the stand or to the range of the crane. The stand or the crane is moreover usually installed in a stationary manner and can therefore be transported to a different location for the measurement of objects with difficulty.

The measurement of larger objects and spaces therefore very often requires a high effort. Since the measurement of large objects is a point one as a rule, the actual shape of the objects is determined by measurement of a few points and interpolation or extrapolation for cost reasons. This can result in substantial imprecision of the measured data.

SUMMARY OF THE INVENTION

It is an object of the present invention to provide an improved apparatus and an improved method for the three-dimensional measurement of objects with which the aforesaid disadvantages are at least very largely eliminated.

The object is satisfied by the features of the independent claims.

The object is in particular satisfied in that, in a method for the three-dimensional measurement of objects in which a measuring element is moved in space relative to an object to be measured, in particular along its surface, the locations of the measuring element are determined relative to a reference system, in particular relative to a fixed reference system, and the dimensions of the object examined are determined from the locations of the measuring element determined, the locations of the measuring element are determined by a locating method with reference to a reference system fixed by the associated locating system, and desired dimensions of the object are calculated from the locations of the measuring element determined.

In accordance with the invention, it is therefore not linear transducers which are used, as previously, to determine the location of the measuring element during the measurement, but a locating method with which the location of the measuring element can be sensed very accurately. The method for the three-dimensional measurement is also less prone to disturbances with respect to vibrations by the use of a locating method for the determination of the location of the measuring element. It is therefore not necessary to use a solid, stationary measuring table, and the method in accordance with the invention can also be used in an industrial environment, that is, directly at the production site.

The method and the apparatus for the three-dimensional measurement of objects are moreover not limited to a maximum size of the objects to be measured, since a large spatial area can be measured with the help of the locating method. The apparatus for the three-dimensional measurement of objects can furthermore be transported relatively easily and can therefore be used for a measurement of objects at different locations. A fast and precise measurement in three-dimensional space is above all made possible since the movement of the measuring element is not limited by the locating method as with linear transducers.

At least one physical field, in particular an acoustic, optical and/or electromagnetic field, can be set up for the location of the measuring element. This is done in particular by a plurality of transmitters positioned around the measuring position as field sources of the physical field, for example sources for visible and/or invisible light, whose locations fix the reference system for the locating method. The distance between the transmitters of the physical field and the measuring element can be determined very precisely from the propagation speed of the physical field from the signal transit time. The more transmitters that are distributed in the space, the more precisely the location of the measuring element can be determined. This permits the measurement of three-dimensional objects with an accuracy of up to approximately ±1 µm.

In an embodiment, a unidirectional locating system can be used to locate the measuring element, in particular in the manner of the global positioning system, GPS. It is consequently a method in which a one-way distance measurement is carried out by means of the transit time of the signals between the transmitters and corresponding sensors on or at the measuring element. The measurement error is thereby kept small and, moreover, the calculation of the dimensions of the object from the determined locations of the measuring element is accelerated.

The measuring element can furthermore scan the object mechanically or in a contact-free manner. The former can, for example, be done using a scanning sphere which is rolled along the surface of the object to be measured. However, the scanning can also take place in a contact-free manner, for example inductively, capacitively or using a pneumatic feeler so that sensitive surfaces can also be measured. The determined location of the measuring element is then corrected using the inductively, capacitively or pneumatically determined spacing of the measuring element from the surface in order to determine the location of the measuring point on the surface. The scan takes place either continuously or at individual scan points, with the current location of the measuring elements being determined and stored as a measured value on every scan.

In a preferred embodiment, the measuring element can be moved by a robot arm. The measuring element can be fixedly installed at the robot arm; however, it can also be releasably secured to the robot arm and can in particular be taken up by a grip of the robot arm as required. For instance, a customary industrial robot can be used for the measurement of the three-dimensional objects and can be combined with transmitters of a physical field and a measuring calculator to determine the dimensions of the three-dimensional object from the locations of the measuring element determined via the locating system. Due to the use of a locating system to determine the location of the measuring element, and thus also of the robot arm, the accuracy of the incremental encoder of the robot does not have to be very high, since the robot can also be very accurately controlled with reference to the locations determined. For this reason, linear x, y, z transducers are also not required for the control of the robot. Moreover, due to the use of a robot for the movement of the measuring element, more degrees of freedom of the movement of the measuring element can be realized in comparison with the previous state of the art. Bore holes can, for example, also be measured.

The robot arm can moreover advantageously simultaneously be used for the movement of the object, in particular for the loading and/or unloading of the measuring apparatus. An additional system for the locating and classification of the workpieces thus becomes superfluous, for example on the measurement of workpieces.

In a further embodiment, the measuring element can be moved with a flying object. The flying object is maneuvered by cable or by remote control; it can, for example, be a model helicopter. This also permits the measurement of large objects, with not only the outer surface of objects such as car bodies being able to be measured, but also, for example, the inner surface of spaces.

Exchangeable measuring elements can furthermore be used. This permits the alternative or sequential use of different scanning methods, for example using mechanical or inductive scanning elements. Moreover, if the measuring element is moved using a robot arm, an object to be measured can first be positioned by a grip of the robot arm and subsequently be measured using an exchangeable measuring element taken up by the same grip or by a second grip.

The locating system can furthermore be calibrated via the transmitters and sensors by self-calibration. This permits a recalibration of the system carried out in short time intervals for which the measurement only has to be interrupted for a short time.

The measuring element can moreover be supplied with energy in a wireless manner, in particular inductively or by means of an accumulator. The measurement data of the measuring element can moreover be transmitted in a wireless manner, in particular inductively or by radio. In both cases, the exchange of a measuring element is simplified and the measurement with different measuring elements accelerated.

The object can be positioned at a zero position for the measurement. This simplifies the measurement, since the location of the measuring object does not first have to be determined.

In a further embodiment, the object to be measured can be measured in accordance with a grid, in particular with an asymmetrical grid. The measurement of the object can be accelerated by provision of a few grid points in specific regions to be measured with less accuracy.

Further advantageous embodiments of the invention are recited in the following Figure description and in the drawings.

BRIEF DESCRIPTION OF THE DRAWINGS

The invention will be described in the following purely by way of example and with reference to the enclosed drawings.

DESCRIPTION OF THE PREFERRED EMBODIMENTS

First Embodiment

Figure 1:
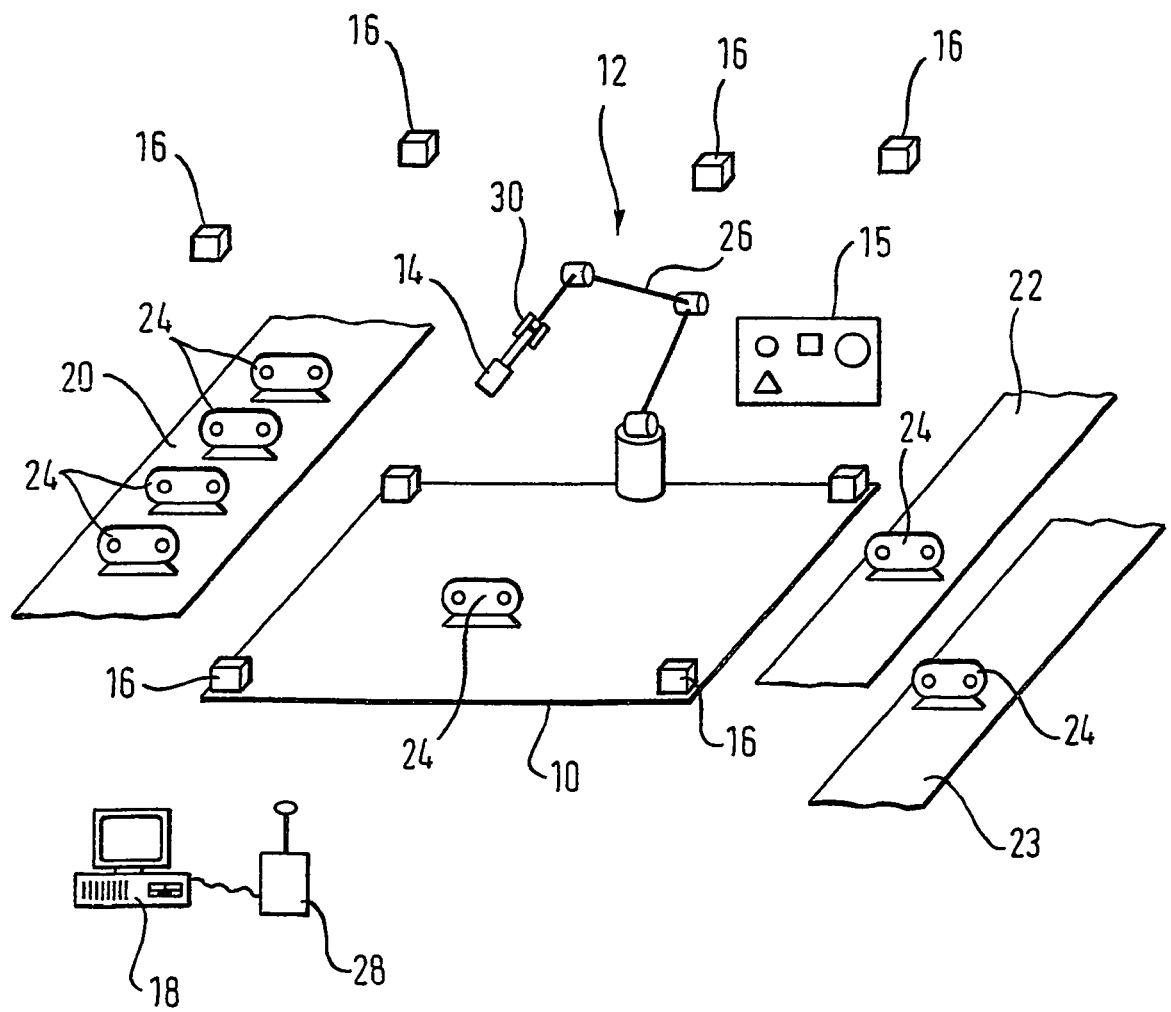
FIG. 1 is a perspective view of a first embodiment of an apparatus in accordance with the invention in a schematic representation.

The first embodiment of the apparatus in accordance with the invention shown in FIG. 1 comprises a measuring table 10, a robot 12, a measuring element 14, a storage position 15 for different measuring elements, a plurality of transmitters 16 and a measuring and control computer 18. For the illustration of a measuring routine which can be used in production, a supply belt 20 and two take-away belts 22 and 23 for workpieces 24 to be measured and already measured workpieces 24 respectively are also shown in FIG. 1.

The transmitters 16 are arranged in the space and on the measuring table such that they are distributed around the workpiece 24. The transmitters 16 are, for example, transmitters for a radio signal, in particular a GPS signal.

The robot 12 is arranged at the measuring table 10 and has a gripping arm 26 whose free end holds the measuring element 14. The robot is a customary industrial robot from its basic design and not only takes up the measuring element 14 from the storage position 15 with the gripping arm 26, but also takes up the respective workpiece 24 to be measured from the supply belt 20 prior to the measurement, positions it on the measuring table 10 and puts the measured workpiece 24 down on the take-away belt 22 or 23 after the measurement in dependence on whether the workpiece is in order or represents a reject.

The gripping arm 26 has a grip 30 at its free end with which the measuring element 14 is taken up, a sensor not shown here for the electromagnetic field generated by the transmitters 16 as well as a radio element which is likewise not shown here and which transmits the signals of the transmitters 16 received by the sensor to a transmitter and receiver module 28 of the measuring and control computer 18.

The measuring element 14, for example, comprises an inductive scanner (not shown) for the scanning of the surface of the workpiece 24 and a radio element (likewise not shown) for the communication with the control and measuring computer 18. Alternatively, the data of the measuring element 14 can be transmitted inductively to a receiver in the gripping arm 26 and from this via electrical lines to the measuring and control computer 18. The measuring element 14 is moreover supplied with energy via the gripping arm 26 by means of an inductive coupling (not shown). The measuring element 14 is made exchangeable by this embodiment and can be taken up from the storage position 15 and immediately used in a suitably functional manner by the gripping arm 26 of the robot 12.

As mentioned above, the measuring and control computer 18 is fitted with a transmitter and receiver module 28. This transmitter and receiver module 28 not only receives the signals of the transmitters 16, but also radios control signals to the transmitters 16, to the robot 12 and to the measuring element 14. In addition, the transmitter and receiver module 28 can receive the measured data of the measuring element 14 and of the sensor at the gripping arm 26.

To carry out the measurement, the first workpiece 24 to be measured on the supply belt is gripped by the gripping arm 26 of the robot 12 and positioned on the measuring table 10. The workpiece 24 is fixed there, for example attracted to the table by electromagnets. The gripping arm 26 subsequently takes up the measuring element 14 from the storage position 15 and scans the workpiece 24 with the measuring element 14. On every scan, the signals of the electromagnetic field generated by the transmitters 16 and received by the sensor at the gripping arm 26 are transmitted by the radio element present on the grip to the measuring and control computer 18.

The measuring and control computer 18 determines the transit times of the signals of the electromagnetic field between the transmitters 16 and the sensor with reference to the signals of the sensor. The sought distances between the transmitters 16 and the sensor result from the product of the propagation speed of the electromagnetic field, which is known, and of the transit time of the respective signal. The measuring and control computer 18 furthermore determines the current location of the sensor, and thus of the measuring element 14, from the computed distances, while the measuring element scans the workpiece 24, and assigns these data to the respective measurement. The dimensions of the workpiece 24 are determined from the detected locations of the measuring element 14 and, with a contact-free scan, from the spacing of the measuring element 14 from the workpiece 24.

The dimensions of the workpiece can be determined very accurately in this manner, without a further device for the three-dimensional measurement having to be used. The effort for a design of special measuring apparatuses is dispensed with by the use of a conventional measuring element 14 with an industrial robot 12 conventional in its basic design. It moreover makes it possible for the robot 12 to be able to be used not only for the measurement, but also for the locating of the workpieces 24. This multiple use of the robot 12 is supported by the exchangeable design of the measuring elements 14.

The use of the described locating system in the three-dimensional measurement of the workpieces 24 moreover permits a highly accurate control of the gripping arm 26 and a determination of the workpiece dimensions using the determined locations of the sensor, without the classical linear X, Y, Z transducers of conventional 3D measuring apparatuses having to be used. Moreover, no stabilizing block of marble is also required as the measuring table for the highly accurate determination of the three-dimensional contour of the workpieces 24. At the same time, a measurement of three-dimensional objects with an accuracy of up to ±1 μm is made possible due to the use of the locating method for the location determination.

Second Embodiment

Figure 2:
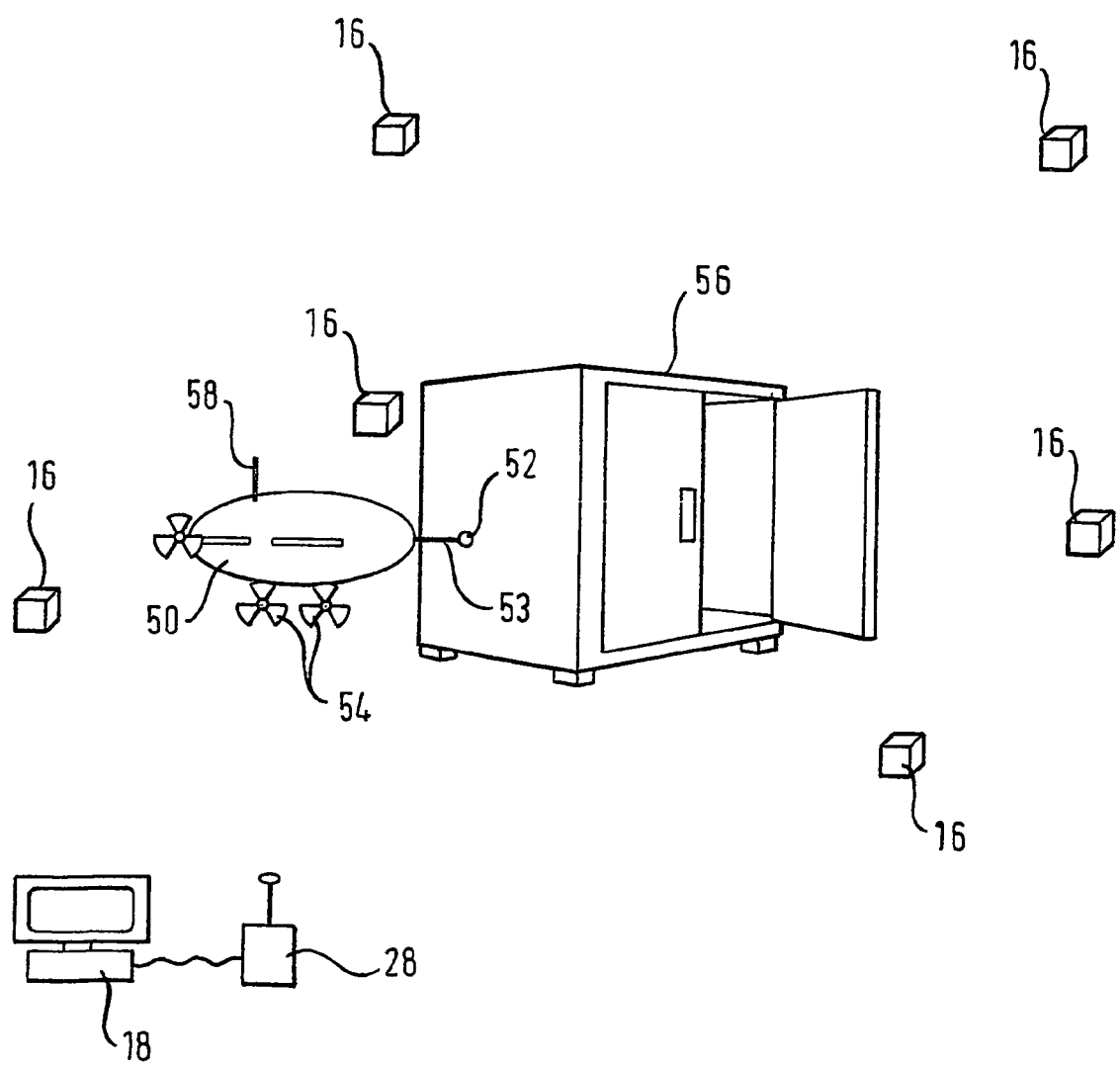
FIG. 2 is a perspective view of a second embodiment of an apparatus in accordance with the invention likewise in a schematic representation.

A second embodiment of the apparatus in accordance with the invention for the three-dimensional measurement of objects is shown in FIG. 2. Components of this apparatus which coincide with components of the first embodiment are provided with the same reference numerals.

The second embodiment comprises a flying object 50 made in the manner of an airship, called a zeppelin in the following, a measuring element 52 on a support 53, transmitters 16 and a measuring and control computer 18.

The zeppelin 50 has lifting and control motors 54 to move the zeppelin 50 in the space around an object 56 to be measured—shown as a closet in the Figure. The lifting and control motors 54 are controlled via control signals which are transmitted to an antenna 58 of the zeppelin by the transmitter and receiver module 28 of the measuring and control computer. The measuring element 52 is provided on the front side of the zeppelin 50. The measured data of the measuring element 52 can be transmitted via the antenna 58 to the transmitter and receiver module 28 of the measuring and control computer 18.

The zeppelin 50 furthermore carries at least one sensor (not shown in FIG. 2) for the reception of the signals of the electromagnetic field generated by the transmitters 16, in particular GPS signals. The sensors have a defined position on or in the zeppelin with respect to the measuring element 52 which can be determined with an elongate carrier 53 of the measuring element 52 by means of a calculation of the spatial orientation of the carrier 53 relative to the sensors.

The energy supply of the zeppelin 50 is secured via high-energy accumulators not shown in FIG. 1; however, a cable can also be provided for the energy supply.

The measuring element 52 is made as a scanning sphere which is arranged at the free end of the carrier 53 attached to the zeppelin. An inductive scanner can be provided as the carrier 53 for the fast recording of a measuring path in the form of a jacket line of the closet 56. The mechanical contact with the object is thus secured and the friction between the scanning sphere and the object is reduced.

In operation, the zeppelin 50 is moved in the space around the closet 56 to be measured by radio by the measuring and control computer 18 such that the scanning sphere of the measuring element 52 comes into contact with the surface of the closet 56 to be measured. To be able to scan larger objects fast and accurately, the space is divided into a grid stored in the measuring and control computer. The grid can be asymmetrical to be able to steer to a large number of points with the zeppelin 50 at specific locations of the space or to be able to scan them with the measuring element 52.

Once the measuring element 52 has come into contact with the closet 56, the zeppelin 50 is moved along the cabinet, while the scanning sphere of the measuring element 52 remains in contact with the surface of the cabinet 56, to determine desired dimensions of the closet 56. For this purpose, as in the first embodiment, a distance measurement is carried out between the transmitters 16 and the sensors, and the location of the zeppelin, and thus the location of the measuring element 52, is determined from the detected distance values. The signals of the transmitters 16 received by the sensors are transmitted for this purpose to the measuring and control computer 18 by radio via the antenna 58. At the same time, the measuring and control computer 18 checks whether the scanning sphere is in contact with the closet. The dimensions of the closet 56 to be determined are computed from the detected locations of the measuring element 52 and, with contact-free measurement, from the spacing of the measuring element 52 from the surface.

The second embodiment is therefore a kind of flying probe for three-dimensional measurement and permits not only the three-dimensional measurement of large objects, but also the measurement of inner spaces due to the large range of the zeppelin 50.

For this purpose, light sources or sound sources, for example ultrasonic sources, can also be used alone or can be combined with one another. The sensors on the zeppelin 50 can then include optical or acoustic interferometers which determine phase shifts with which the locations of the measuring element, and thus the dimensions of large objects or the dimensions of inner spaces, can be determined even more accurately.

The sensors for the field can not only be arranged at the grip or on the flying object, but alternatively or additionally at or in the measuring element, if sufficient space is present there, or also at a carrier of the measuring element. Internal, field-independent sensors can moreover be provided to determine the orientation of the measuring elements in the space, in particular relative to the grip.

The measuring system in accordance with the invention can advantageously also be used under water, for example in nuclear power stations.

The invention claimed is:

1. A method for the three-dimensional measurement of objects in which a measuring element is moved in space relative to an object to be measured, in particular along its surface, the locations of the measuring element are determined relative to a reference system, in particular relative to a fixed reference system, and the dimensions of the object examined are determined from the detected locations of the measuring element, wherein the locations of the measuring element are determined by a locating method with reference to a reference system fixed by the associated locating system and the dimensions of the object are calculated from the locations of the measuring element determined in this manner, and wherein a plurality of physical fields comprising an acoustic, optical or electromagnetic field are set up for the location of the measuring element.

2. A method in accordance with claim 1, characterized in that a global positioning system, GPS, is used for the locating of the measuring element.

3. A method in accordance with claim 1, characterized in that the measuring element scans the object mechanically or in a contact-free manner.

4. A method in accordance with claim 1, characterized in that the measuring element is moved by a robot arm.

5. A method in accordance with claim 1, characterized in that at least one exchangeable measuring element is used.

6. A method in accordance with claim 1, characterized in that the locating system is calibrated by self-calibration.

7. A method in accordance with claim 1, characterized in that the measuring element is supplied with energy in a wireless manner, in particular inductively or by means of an accumulator.

8. A method in accordance with claim 1, characterized in that the measurement data of the measuring element are transmitted in a wireless manner, in particular inductively or by radio.

9. An apparatus in accordance with claim 1 characterized in that the object is positioned at a zero position for the measurement.

10. A method for the three-dimensional measurement of objects in which a measuring element is moved in space relative to an object to be measured, in particular along its surface, the locations of the measuring element are determined relative to a reference system, in particular relative to a fixed reference system, and the dimensions of the object examined are determined from the detected locations of the measuring element, wherein the locations of the measuring element are determined by a locating method with reference to a reference system fixed by the associated locating system and desired dimensions of the object are calculated from the locations of the measuring element determined in this manner, and wherein a robot arm is simultaneously used for the movement of the object, in particular for the loading and/or unloading of the measuring apparatus.

11. A method for the three-dimensional measurement of objects in which a measuring element is moved in space relative to an object to be measured, in particular along its surface, the locations of the measuring element are determined relative to a reference system, in particular relative to a fixed reference system, and the dimensions of the object examined are determined from the detected locations of the measuring element, wherein the locations of the measuring element are determined by a locating method with reference to a reference system fixed by the associated locating system and desired dimensions of the object are calculated from the locations of the measuring element determined in this manner, and wherein the measuring element is moved by a flying object.

12. An apparatus for the three-dimensional measurement of objects comprising a measured element movable in space relative to an object to be measured, in particular along its surface;

means for the determination of the location of the measuring element at the measuring positions relative to a reference system, in particular relative to a fixed reference system, and means for the determination of the dimensions of the object from the detected locations of the measuring element, wherein a locating system is provided for the determination of the location of the measuring element with reference to the reference system fixed by the locating system and in that means are provided for the calculation of object dimensions from the locations determined in this manner, and wherein the locating system has a plurality of means for the setting up of a physical field, in particular of an acoustic, optical and/or and electromagnetic field.

13. An apparatus in accordance with claim 12, characterized in that the locating system is made as a global positioning system, GPS.

14. An apparatus in accordance with claim 12, characterized in that the measuring element is made as a mechanical or contact-free scanning element.

15. An apparatus in accordance with claim 12, characterized in that the measuring element is arranged at a robot arm.

16. An apparatus in accordance with claim 12, characterized in that the measuring element is exchangeable.

17. An apparatus in accordance with claim 12, characterized in that means are provided for the self-calibration of the locating system.

18. An apparatus in accordance with claim 12, characterized in that means are provided for the wireless energy supply of the measuring element, in particular means for the inductive energy supply or an accumulator.

19. An apparatus in accordance with claim 12, characterized in that means are provided for the wireless transmission of the measured data, in particular means for inductive transmission or for transmission by radio.

20. An apparatus in accordance with claim 12, characterized in that a zero position is provided for the object to be measured.

21. An apparatus for the three-dimensional measurement of objects comprising a measured element movable in space relative to an object to be measured, in particular along its surface;

means for the determination of the location of the measuring element at the measuring positions relative to a reference system, in particular relative to a fixed reference system, and means for the determination of the dimensions of the object from the detected locations of the measuring element, wherein a locating system is provided for the determination of the location of the measuring element with reference to the reference system fixed by the locating system and in that means are provided for the calculation of object dimensions from the locations determined in this manner, the measuring element being arranged at a robot arm, and wherein the robot arm has a gripping element for the gripping of the measuring element and/or of the object and is made to move the measuring element between pick-up and put-down positions and the measuring position.

22. An apparatus for the three-dimensional measurement of objects comprising a measured element movable in space relative to an object to be measured, in particular along its surface;

means for the determination of the location of the measuring element at the measuring positions relative to a reference system, in particular relative to a fixed reference system, and means for the determination of the dimensions of the object from the detected locations of the measuring element, wherein a locating system is provided for the determination of the location of the measuring element with reference to the reference system fixed by the locating system and in that means are provided for the calculation of object dimensions from the locations determined in this manner, and wherein the measuring element is arranged at a flying object.

* * * * *